US009990313B2

(12) United States Patent
Monji et al.

(10) Patent No.: US 9,990,313 B2
(45) Date of Patent: Jun. 5, 2018

(54) STORAGE APPARATUS AND INTERFACE APPARATUS (71) Applicant: HITACHI, LTD., Tokyo (JP)

(72) Inventors: Hideaki Monji, Tokyo (JP); Yoshiaki Eguchi, Tokyo (JP)

(73) Assignee: HITACHI, LTD., Tokyo (JP)

(*) Notice: Subject to any disclaimer, the term of this patent is extended or adjusted under 35 U.S.C. 154(b) by 133 days.

(21) Appl. No.: 15/125,992

(22) PCT Filed: Jun. 19, 2014

(86) PCT No.: PCT/JP2014/066277
§ 371 (c)(1),
(2) Date: Sep. 14, 2016

(87) PCT Pub. No.: WO2015/194005
PCT Pub. Date: Dec. 23, 2015

(65) Prior Publication Data
US 2017/0075828 A1    Mar. 16, 2017

(51) Int. Cl.
G06F 13/00    (2006.01)
G06F 13/16    (2006.01)
G06F 3/06    (2006.01)
G06F 12/00    (2006.01)
G06F 13/10    (2006.01)
(Continued)

(52) U.S. Cl.
CPC ............ *G06F 13/1668* (2013.01); *G06F 3/06* (2013.01); *G06F 12/00* (2013.01); *G06F 13/10* (2013.01); *G06F 13/28* (2013.01); *G06F 13/4068* (2013.01); *G06F 13/42* (2013.01); *G06F 13/4282* (2013.01); *G06F 2213/0026* (2013.01)

(58) Field of Classification Search
None
See application file for complete search history.

(56) References Cited

U.S. PATENT DOCUMENTS 7,363,417 B1    4/2008 Ngai
8,171,230 B2    5/2012 Freimuth et al.
(Continued)

FOREIGN PATENT DOCUMENTS

JP    2014-002545 A    1/2014
WO    2012/169027 A1    12/2012

OTHER PUBLICATIONS

NVM Express, Revision 1.1a; Sep. 23, 2013, amber.huffman@intel.com.
(Continued)

*Primary Examiner* — Elias Mamo
(74) *Attorney, Agent, or Firm* — Volpe and Koenig, P.C.

(57) ABSTRACT

Starting a host computer and a high-speed data transfer achieved by NVMe are both realized. When the host computer is started and a command for instructing to read an OS in accordance with a specific protocol is issued from the host computer via a host-side bus to a specific function from among a plurality of functions, an interface device issues to a controller a request for instructing to read the OS and transfers the OS read by the controller to the host computer. When an NVMe command for instructing an I/O for the controller in accordance with an NVMe protocol is issued from the host computer via the host-side bus to an NVMe function from among a plurality of functions after the host computer is started, the interface device issues to the controller an I/O request based on the NVMe command.

10 Claims, 7 Drawing Sheets (51) Int. Cl.
*G06F 13/28* (2006.01)
*G06F 13/42* (2006.01)
*G06F 13/40* (2006.01)

(56) References Cited

U.S. PATENT DOCUMENTS

| | | |
|---|---|---|
| 8,347,010 B1 | 1/2013 | Radovanovic |
| 8,521,941 B2 | 8/2013 | Regula |
| 8,645,605 B2 | 2/2014 | Subramaniyan et al. |
| 8,661,178 B2 | 2/2014 | Richard |
| 9,021,168 B1 | 4/2015 | Horn et al. |
| 2003/0024595 A1 | 2/2003 | Davis et al. |
| 2007/0192560 A1 | 8/2007 | Furuhashi |
| 2008/0288674 A1 | 11/2008 | Suzuki et al. |
| 2009/0025007 A1 | 1/2009 | Hara et al. |
| 2009/0157958 A1 | 6/2009 | Maroney et al. |
| 2009/0168525 A1 | 7/2009 | Olbrich et al. |
| 2010/0077117 A1 | 3/2010 | Asnaashari |
| 2010/0125653 A1 | 5/2010 | Cherian et al. |
| 2012/0177035 A1 | 7/2012 | Sharma et al. |
| 2012/0317358 A1 | 12/2012 | Ando et al. |
| 2013/0135816 A1 | 5/2013 | Huang |
| 2013/0191590 A1 | 7/2013 | Malwankar |
| 2013/0198312 A1 | 8/2013 | Tamir et al. |
| 2013/0254435 A1 | 9/2013 | Shapiro et al. |
| 2014/0195634 A1 | 7/2014 | Kishore et al. |
| 2014/0281040 A1 | 9/2014 | Liu |
| 2014/0337540 A1 | 11/2014 | Johnson et al. |
| 2015/0006663 A1 | 1/2015 | Huang |
| 2015/0039815 A1 | 2/2015 | Klein |
| 2015/0095554 A1 | 4/2015 | Asnaashari et al. |
| 2015/0095555 A1 | 4/2015 | Asnaashari et al. |
| 2015/0120874 A1 | 4/2015 | Kim et al. |
| 2015/0160886 A1 | 6/2015 | Hoglund et al. |
| 2015/0222705 A1 | 8/2015 | Stephens |
| 2015/0254088 A1 | 9/2015 | Chou et al. |
| 2015/0317177 A1 | 11/2015 | Hussain et al. |

OTHER PUBLICATIONS

Janene Ellefson; NVM Express: Unlock Your Solid State Drives Potential; Flash Memory Summit 2013.

Cobb et al., "NVM Express and the PCI Express SSD Revolution," IDF 2012 Intel Developer Forum, [online: http://nvmexpress.org/wpcontent/uploads/2013/04/IDF-2012-NVM-Express-and-the-PCI-Express-SSD-Revolution.pdf], pp. 1-48.

Cole, A., "Next-Gen IOV Getting Ready for the Cloud," IT Business Edge, [online: www.itbusinessedge.com/cm/blogs/cole/next-gen-iovgetting-ready-for-the-cloud/?cs=33833], pp. 2-4, Posted Jul. 2, 2009.

Luse, P., "Introduction to the NVMe Working Group Initiative," Open Fabrics Alliance, [online: openfabric.org], pp. 1-27, Mar. 27, 2012.

Mishra, R, "NVMe—Removing the Performance Bottleneck on SSDs," UNH InterOperability Laboratory, [online: https://www.iol.ung.edu/blog/2012/11/09/nvme-removing-performance-bottleneck-ssds], Nov. 9, 2012.

Ostler, P.S., et al., "FPGA Bootstrapping on PCIe Using Partial Reconfiguration," 2011 International Conference on Reconfigurable Computing and FPGAs, pp. 380-385, Brigham Young University, Provo, UT.

Eshghi, K., et al., "SSD Architecture and PCI Express Interface, Inside Solid State Drives (SSDs)," Springer Netherlands, 2013, pp. 19-45, [online] Internet <retrieval date: Aug. 28, 2014 (Aug. 28, 2014)>.

Huffman, A., "NVM Express: Optimized Interface for PCI Express SSDs," IDF13, Sep. 10, 2013, [online] Internet <retrieval date: Aug. 28, 2014 (Aug. 28, 2014)>.

| # | Device mode | FCP No. of functions | NVMe No. of functions | LRP/Function |
|---|---|---|---|---|
| 1 | 1FCP | 1 (Function#0) | 0 | 4 |
| 2 | 2FCP | 2 (Function#0,1) | 0 | 2 |
| 3 | 1FCP/1NVMe | 1 (Function#0) | 1 (Function#2) | 4 |
| 4 | 2FCP/2NVMe | 2 (Function#0,1) | 2 (Function#2,3) | 2 |

STORAGE APPARATUS AND INTERFACE APPARATUS

TECHNICAL FIELD

The present invention relates to a storage apparatus and an interface apparatus.

BACKGROUND ART

As a protocol used in a Storage Area Network (SAN), Fibre Channel Protocol (FCP) is known. Further, NVM Express (NVMe) is known which is a protocol allowing for an optimization of an interface register where a non-volatile memory is regarded as a target device. When the NVMe is used, it is possible to achieve a high-speed Input/Output (I/O) with a low load, as compared to the FCP. NPL 1 discloses a Solid State Drive (SSD) that supports an NVMe protocol. NPL 1 states that, as compared to an SSD using a protocol such as Serial Advanced Technology Attachment (SATA) used in a conventional Hard Disk Drive (HDD), the SSD using the NVMe enables a low latency I/O.

CITATION LIST

Patent Literature

[NPL 1] "NVM Express: Unlock Your Solid State Drives Potential," http://www.nvmexpress.org/wp-content/uploads/2013-FMS-NVMe-Track.pdf

SUMMARY OF INVENTION

Technical Problem

When an operating system (OS) of a server apparatus is booted up from a network, the NVMe does not support booting the OS, and thus, the server apparatus needs to use another protocol to read the OS. For example, a PCI Express (PCIe) bus card that supports a protocol enabling OS to be booted and a PCIe bus card that supports the NVMe are mounted in the server apparatus. This configuration uses two bus slots of the server apparatus. The server apparatus, which occupies one bus slot for a protocol used for booting the OS, is not capable of using a band provided in the bus slot for an I/O in the NVMe protocol.

Further, hardware that complies with an NVMe specification is capable of being controlled by a standard driver provided from an OS vendor. When hardware that complies with the NVMe specification is created, it is not necessary to create device driver software; however, it is difficult to extend a function not defined in the NVMe specification.

Solution to Problem

To solve the above-described problems, a storage apparatus according to one aspect of the present invention comprises: a storage device; a controller coupled to the storage device; and an interface device coupled to the controller via a storage-side bus based on a PCI Express specification and coupled to a host computer via a host-side bus based on the PCI Express specification. The interface device provides the host computer with a plurality of functions based on the PCI Express specification. When the host computer is started and a command for instructing to read an OS stored in the storage device in accordance with a specific protocol is issued from the host computer via the host-side bus to a specific function from among a plurality of functions, the interface device issues to the controller a request for instructing to read the OS and transfers the OS read by the controller to the host computer. When an NVMe command for instructing an I/O for the controller in accordance with an NVMe protocol is issued from the host computer via the host-side bus to an NVMe function from among a plurality of functions after the host computer is started, the interface device issues to the controller an I/O request based on the NVMe command.

DESCRIPTION OF EMBODIMENTS

With reference to the drawings, embodiments will be described, below. However, the present embodiments are merely one example for realizing the invention, and will not limit the technical scope of the invention. Further, a configuration common in each figure is assigned with an identical reference numeral.

It is noted that in the following description, information on the present embodiment will be described using an expression such as a "register" and a "queue"; however, the information may not necessarily be represented in a data structure of a "register" and a "queue". For example, the information may be represented in a data structure of a "table", a "list", a "DB (database)", etc., or other formats. For this reason, in order to ensure that the information is not dependent on a data structure, a "table", a "list", a "DB", a "register", a "queue", etc., may be simply referred to as "information". Furthermore, when the content of each item of information is described, the expressions such as "identification information", "identifier", "title", "name", and "ID" may be used; these are mutually replaceable.

In the following description, description proceeds while a "program" serves as a grammatical subject; however, the program is executed by a CPU (Central Processing Unit) to execute a defined process by using a memory and a communication port (communication control apparatus), and in this sense, the description may proceed while a CPU serves as a grammatical subject. Additionally, the processes disclosed while a program serves as a grammatical subject may also be executed by a computer such as a server computer, a storage controller, and a management computer, or an information processing apparatus. A part or a whole of the program may be realized by dedicated hardware or may be made to be modularized. Various types of programs may be installed onto each computer via a program distribution server or storage media.

It is noted that the following description may also be applied to a next-generation specification of NVMe expected to be available soon, and similarly, may also be applied to a next-generation specification of PCI-Express (Peripheral Component Interconnect Express: hereinafter, abbreviated as PCIe). When a term related to NVMe and PCIe is used, the term should be considered to also indicate an identical or similar term used in the next-generation specification. Likewise, when an embodiment is described, NVMe where a current Block access is targeted is intended; however, if a byte-based or word-based access is defined in the NVMe specification, it goes without saying that the present embodiment can also be applied to such an access. Likewise, when an embodiment is described, a non-volatile storage device using a flash memory is intended; however, the embodiment may be applied to a non-volatile memory other than a flash memory such as a non-volatile storage device using an FeRAM (Ferroelectric Random Access Memory), an MRAM (Magnetoresistive Random Access Memory), a phase change memory (Ovonic Unified Memory), RRAM (registered trademark, Resistance RAM).

First Embodiment

A configuration of a computer system of the present embodiment will be described, below.

Figure 1:
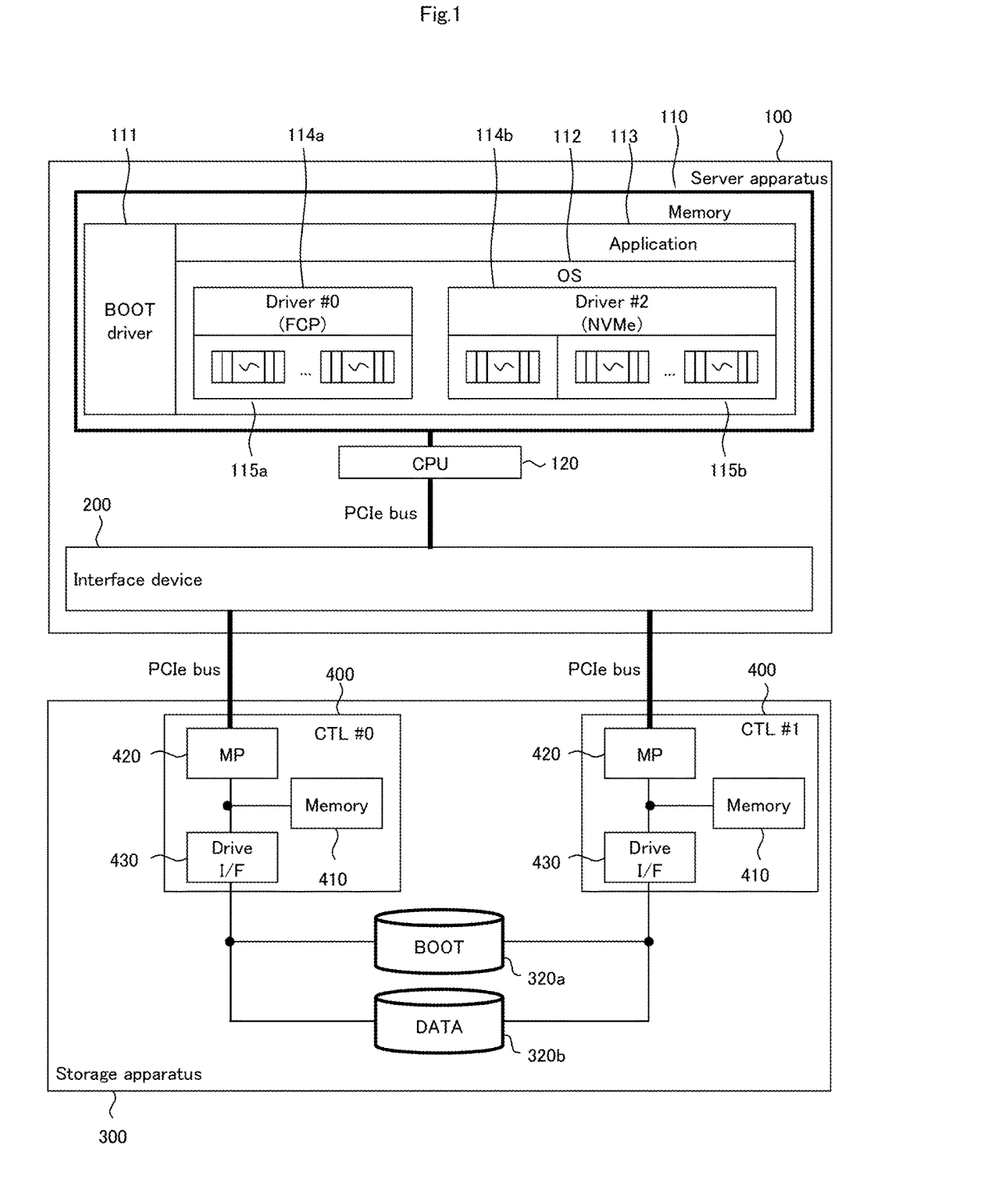
FIG. 1 shows a configuration of a computer system according to a first embodiment.

FIG. 1 shows a configuration of a computer system according to a first embodiment.

When it is not necessary to distinguish elements by an alphabet of a reference sign, it may omit the alphabet of a reference sign. The computer system includes a server apparatus 100 and a storage apparatus 300. The server apparatus 100 includes a memory 110, a CPU 120, and an interface device 200. The storage apparatus 300 includes a plurality of controllers (CTLs) 400 and a plurality of storage devices 320. The plurality of storage devices 320 include a flash memory. It is noted that the plurality of storage devices may include an HDD. The storage apparatus 300 according to the present embodiment includes two controllers 400 each called a controller #0, #1.

It is noted that the present computer system preferably is a Converged Platform. It is noted that the Converged Platform is also called "Converged Infrastructure" and "Converged System", and "Converged" may be replaced by the term "vertically integrated" in Japanese. In the present embodiment, these are simply called Converged Platform (which may be abbreviated as CPF) throughout the following description. The CPF is characterized as follows:

The CPF is a product including a server apparatus, a storage apparatus (including a controller and a storage device), and an interface device coupling these apparatuses. When an administrator of a company introduces a server apparatus and a storage apparatus individually, a typical operation verification to check whether the server apparatus and the storage apparatus are coupled is performed by the administrator. However, when the CPF is introduced, a vendor selling the product performs the operation verification in advance, and thus, the client administrator installing and using the product is capable of eliminating or reducing the operation verification;

It is noted that some CPFs may include a management sub system that executes a management program for collectively configuring a server apparatus, a storage apparatus, and an interface device. The management subsystem is capable of quickly providing an execution environment (such as a virtual machine, a DBMS: Database Management System, and a Web server) desired by an administrator.

For example, in order to provide a virtual machine having a necessary resource amount, the management program requests a server computer and a storage system to allocate a necessary resource, and requests a hypervisor to create a virtual machine by using the allocated resource.

In the server apparatus 100, the memory 110 stores therein a program and data for a process by the server apparatus 100. The CPU 120 is coupled via an internal bus to the memory 110 and executes the process of the server apparatus 100 in accordance with the program stored in the memory 110.

In the storage apparatus 300, the controller 400 is coupled to the interface device 200, and executes a process in response to an I/O request from the interface device 200. The controller 400 includes a memory 410, a CPU 420, and a drive interface 430. The memory 410 stores the programs and data for a process by the controller 400. The CPU 420 is coupled via an internal bus to the memory 410 and executes the process of the controller 400 in accordance with the program stored in the memory 410. The drive interface 430 is coupled to the CPU 420 and the storage device 320, and controls communication between the controller 400 and the storage device 320. The storage device 320 stores data, is coupled to the controller 400, and is accessed from the controller 400. In the storage apparatus 300 according to the present embodiment, two storage devices 320 are included each called a boot device (BOOT) and a data device (DATA). The boot device stores a program for the server apparatus 100. The data device stores data from the controller 400.

The interface device 200 is coupled via a server-side bus to the CPU 120, coupled via a storage-side bus to the storage apparatus 300, and controls communication between the server apparatus 100 and the storage apparatus 300. The server-side bus and the storage-side bus in the present embodiment are PCIe buses. The interface device 200 in the present embodiment is coupled to each of the two controllers 400 via two storage-side buses. For example, the interface device 200 is a circuit board (add-on card) inserted to a PCIe bus slot of the server apparatus 100. The storage-side bus may be a PCIe bus cable, and may be a circuit board. Further, the interface device 200 may be located outside the server apparatus 100, and may be coupled via the PCIe bus cable coupled to the PCIe bus slot of the server apparatus 100.

The memory 110 stores a boot driver 111, an OS 112, an application 113, and a driver 114 (device driver). The boot driver 111 is a program, for example, based on a Basic Input/Output System (BIOS) or an Extensible Firmware Interface (EFI), for example. The boot driver 111 is read into the memory 110 when the server apparatus 100 is powered on, and executed by the CPU 120. The OS 112 is stored in a boot device in the storage apparatus 300, read by the boot driver 111 into the memory 110 in the server apparatus 100, and is executed by the CPU 120. The boot driver 111 issues, in accordance with the FCP, an I/O command for instructing to read the OS 112 in the boot device, to the interface device 200.

The plurality of drivers 114 include a driver 114a using the FCP and a driver 114b using the NVMe. For example, the driver 114a is allowed to use vendor proprietary software not included in the OS 112 and to include a function of controlling the interface device 200. As a result, the driver 114b is capable of using a standard driver included in the OS 112. It is noted that, instead of the FCP, another protocol used when the server apparatus 100 is booted, such as TCP-IP (Transmission Control Protocol-Internet Protocol), may be used.

The application 113 is stored in a data device in the storage apparatus 300, read by a user of the server apparatus 100 or the OS 112 into the memory 110 in the server apparatus 100, and is executed by the CPU 120. The application 113 issues a request related to data to the driver 114. The driver 114 includes a queue 115 in which the request from the application 113 is stored. The driver 114 issues an I/O command using the corresponding protocol to the interface device 200, on the basis of the request from the application 113.

It is noted that when the interface device 200 is realized as what is termed as an add-on card inserted into the PCIe bus slot of the server apparatus 100, a failure occurrence rate may decrease. That is because the PCIe bus (server-side bus) between the CPU 120 and the interface device 200 is not made redundant, and thus, when a distance of the server-side bus is shortened by using the interface device 200 as an add-on card, it is possible to decrease likelihood that the server-side bus is cut. Further, when the coupling (storage-side bus) between the interface device 200 and the storage apparatus 300 is made by way of a cable wiring rather than a circuit board wiring as in a backplane of a blade server, a maintenance worker may cut a cable wiring section by mistake, and thus, if the add-on card is provided, then the server-side bus does not need to enter the cable wiring section.

It is noted that there may be a plurality of server apparatuses 100, and the storage device 320 of the storage apparatus 300 may be shared. Further, the storage apparatus 300 may have one controller 400 or three controllers 400 or more.

Figure 2:
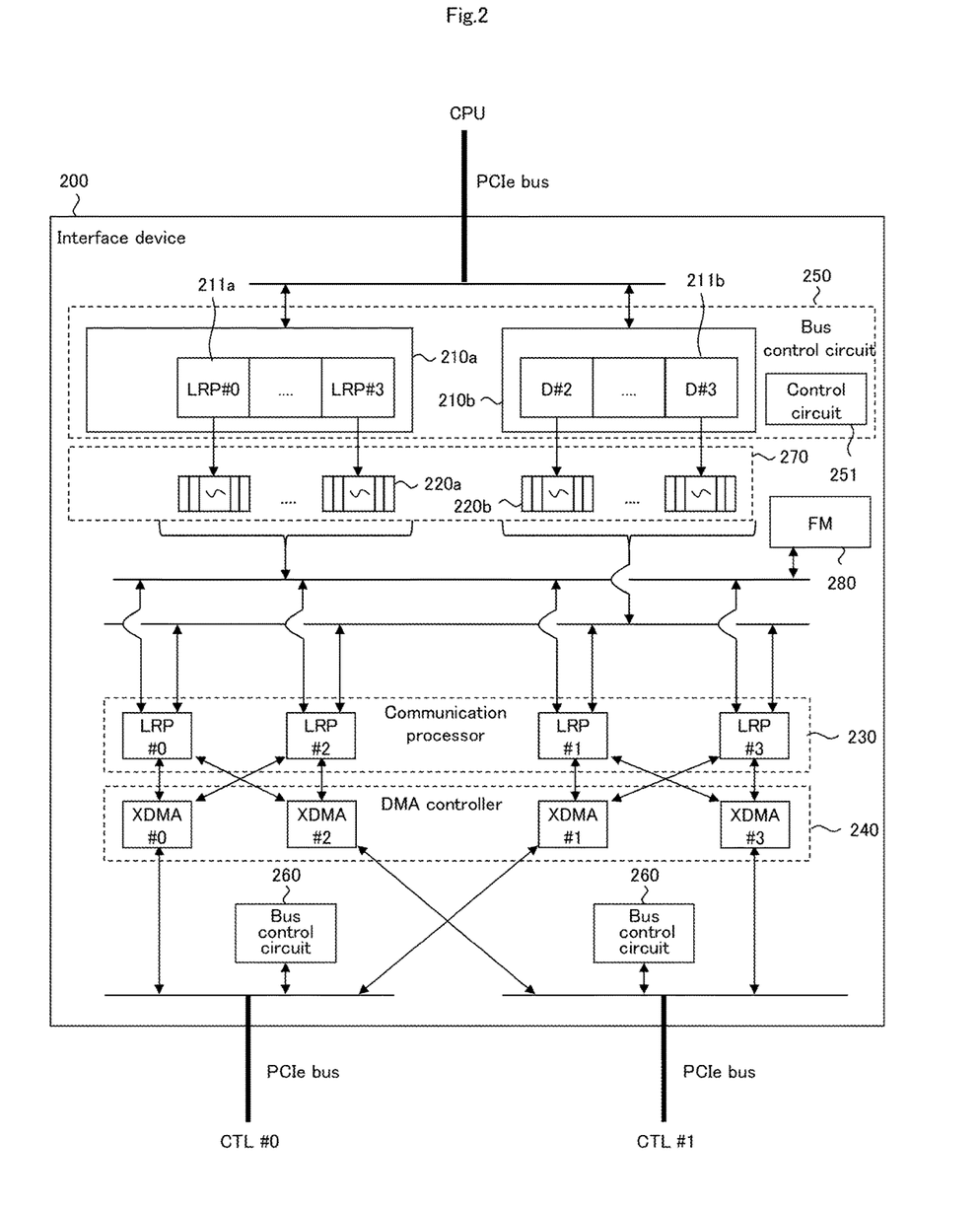
FIG. 2 shows a configuration of an interface device 200 according to a first embodiment.

FIG. 2 shows a configuration of the interface device 200 according to the first embodiment.

The interface device 200 includes a communication processor 230, a DMA controller 240, a bus control circuit 250, a plurality of bus control circuits 260, a memory 270, and a flash memory 280. These elements are coupled via an internal bus. The communication processor 230 includes a plurality of processor cores (LRPs). It is noted that the processor core may be a processor. The DMA controller 240 includes a plurality of DMA cores (XDMAs). The memory 270 includes a plurality of I/O command start queues 220. The flash memory 280 includes a storage area corresponding to an extended ROM space of the PCIe provided to the server apparatus 100, and stores the above-described boot driver 111 into the storage area. When the server apparatus 100 is started, the server apparatus 100 designates the extended ROM space to thereby read the boot driver 111 from the flash memory 280 into the memory 110 of the server apparatus 100 and execute the boot driver 111. It is noted that the boot driver 111 may be stored in the server apparatus 100 or a non-volatile memory in the storage apparatus 300.

The bus control circuit 250 is coupled via the server-side bus to the CPU 120 of the server apparatus 100. The bus control circuit 250 includes a control circuit 251, a server register 210a accessed by the driver 114a of the server apparatus 100, and a server register 210b accessed by the driver 114b of the server apparatus 100. The control circuit 251 controls the server registers 210a, 210b, and the memory 270. The server registers 210a, 210b are allocated to a Memory Mapped Input/Output (MMIO) space in an address space used by the CPU 120. The server register 210a includes an I/O command start register 211a for each of the processor cores (LRP #0 to LRP #3). The server register 210b includes an I/O command start register 211b for each of the drivers 114b (D#2 and D#3).

The memory 270 stores a program and data used by the communication processor 230. The memory 270 further includes an I/O command start queue 220a corresponding to the I/O command start register 211a and an I/O command start queue 220b corresponding to the I/O command start register 211b. The control circuit 251 enters identification information of the I/O command written in the I/O command start register 211a, into the corresponding I/O command start queue 220a, and enters identification information of the I/O command written in the I/O command start register 211b, into the corresponding I/O command start queue 220b. Each processor core allocated to the FCP retrieves the identification information in the corresponding I/O command start queue 220a. A processor core that processes the NVMe regularly monitors the I/O command start queue 220b, and when the identification information is detected, the processor core retrieves the identification information.

The bus control circuit 260 is arranged for each storage-side bus. The bus control circuit 260 is coupled via the storage-side bus to an MP 420 of the controller 400 of the storage apparatus 300. The bus control circuit 260 includes a control circuit and a storage register accessed by the controller 400. The control circuit controls the storage register and the memory 270.

In the server-side bus, the server apparatus 100 is Root Complex, and the interface device 200 is Endpoint. In the storage-side bus, the controller 400 is Root Complex, and the interface device 200 is Endpoint.

The communication processor 230 acquires the I/O command on the basis of the identification information retrieved from the I/O command start queue 220 and issues an I/O request based on the I/O command to the storage apparatus 300. Further, the communication processor 230 acquires information for a DMA from the server apparatus 100 and the storage apparatus 300 and issues an instruction of the DMA to the DMA controller 240, on the basis of the acquired information. The DMA controller 240 executes, on the basis of the instruction from the communication processor 230, a burst transmission between the memory 110 in the server apparatus 100 and the memory 410 in the storage apparatus 300.

The interface device 200 in the present embodiment includes four processor cores, four DMA cores, and two target ports. The target port is a port to which the storage-side bus is coupled in the interface device 200, and arranged in each controller 400. One, two, or four functions are arranged for the interface device 200. The function shows a function of the PCIe device. As a result of having a plurality of functions, one PCIe device is capable of functioning as a plurality of PCIe devices. The function in the present embodiment is either an FCP function of processing an I/O command that complies with the FCP or an NVMe function of processing an I/O command that complies with the NVMe. Each of the four processor cores is allocated to any one of the functions.

According to such a configuration, the server apparatus 100 is capable of accessing data in the storage apparatus 300 by using a plurality of protocols. Further, it is possible to use a specific protocol which is capable of reading the OS of the server apparatus 100, in addition to the NVMe which is not capable of reading the OS thereof. When the interface device 200 stores the boot driver 111 in a non-volatile memory allocated to an extended ROM area, the server apparatus 100 is capable of reading the boot driver 111 via the PCIe bus. As compared to a case of using a bus for each protocol, when the server-side bus is shared among a plurality of protocols, it is possible to reduce consumption of a bus slot of the server apparatus 100. As compared to a case of using an interface device for each protocol, when the interface device 200 is shared among a plurality of protocols, it is possible to share the memory 270, the communication processor 230, a Serializer/deserializer (SerDes), etc., among a plurality of protocols and it is thus possible to reduce a development cost and its depreciation. When the server apparatus 100 reads and boots the OS, via the server-side bus, with a specific protocol and after the boot, transfers data, via the server-side bus, with the NVMe protocol, it is possible to use a band of the server-side bus used by the specific protocol for the NVMe protocol and it is thus possible to effectively use the band of the server-side bus.

The function is decided by a device mode. An administrator of the computer system is capable of configuring any one of the plurality of device modes, to the interface device 200. For example, the bus control circuit 250 reads information on the device mode previously stored in the flash memory 280 when the computer system is started, and configures the device mode by the time of Link Up of the PCIe. Further, the device mode of the interface device 200 may be configured from the server apparatus 100, a management subsystem coupled to the computer system, an external pin arranged in the interface device 200, etc.

A device mode in which the function of the interface device 200 is configured will be described, below.

Figure 3:
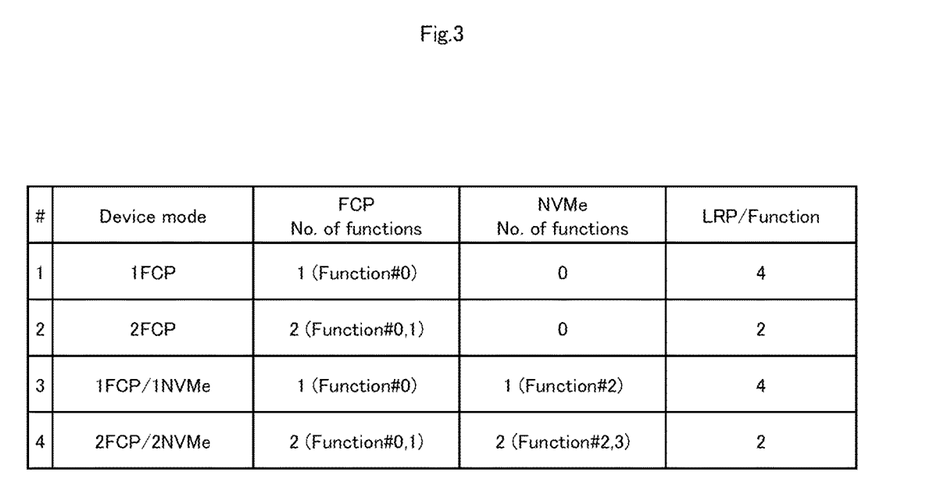
FIG. 3 shows a device mode of an interface device 200.

FIG. 3 shows a device mode of the interface device 200.

In the present embodiment, the interface device 200 is configured to any one of device modes #1 to #4. The device mode #1 may be called as "1FCP mode". In this device mode, the interface device 200 holds a function #0 that is one FCP function, and allocates four processor cores to the one function. The device mode #2 may be called "2FCP mode". In this device mode, the interface device 200 holds functions #0, #1 that are two FCP functions, and allocates two processor cores to each function. The device mode #3 may be called "1FCP/1NVMe mode". In this device mode, the interface device 200 holds the function #0 that is one FCP function and the function #2 that is one NVMe function, and allocates four processor cores to each function. The device mode #4 may be called "2FCP/2NVMe mode". In this device mode, the interface device 200 holds the functions #0, #1 that are two FCP functions and functions #2, #3 that are two NVMe functions, and allocates two processor cores to each function. In the device modes #3, #4, it is unlikely that both the FCP and the NVMe are busy, and thus, it is possible for the FCP function and the NVMe function to share the same processor core in a time division manner.

The server-side bus may be a multi-path. In this case, as in the device modes #2, #4, when the interface device 200 includes the two functions of the same protocol respectively corresponding to two paths and the server apparatus 100 executes the two drivers 114b that respectively control the two functions to thereby execute a path manager program of selecting the two drivers 114b, it is possible to assign the I/O command to a plurality of paths. In these device modes, the number of communication processors per function is two, and thus, a maximum performance per path of the server-side bus is limited to a performance of the two processor cores.

It is noted that the communication processor 230 may assign an I/O request to the plurality of controllers 400. In this case, it is not necessary for each of the two NVMe functions to use the two processor cores, and one NVMe function may use four processor cores. Further, it may be configured so that the interface device 200 presents two FCP functions #0, #1 to the server apparatus 100, issues an I/O request to a CTL #0 when the FCP function #0 starts the I/O, and issues an I/O request to a CTL #1 when the FCP function #1 starts the I/O. Further, when the interface device 200 presents one function to the server apparatus 100 for one protocol, the communication processor 230 may determine, on the basis of a use situation of a band of each controller 400, an address in the storage apparatus 300 to which access is made, etc., to which of the CTL #0 or #1 the I/O request is issued. For example, the communication processor 230 acquires, as a use situation of a band, information indicating whether data is currently transferred (busy) from each controller 400, and when it is determined that one controller 400 is busy, the communication processor 230 issues the I/O request to the other controller 400. Further, by issuing a write request of the same data to the plurality of controllers 400, the communication processor 300 may write the data in a redundant manner to increase the reliability of the data.

When the storage apparatus 300 includes the plurality of controllers 400, even if there is a failure in a certain controller 400, as an I/O request is issued to another controller 400, it is possible to improve the reliability of the computer system. Further, when the communication processor 230 is coupled to a plurality of target ports and the plurality of target ports are coupled to each of the plurality of controllers 400, the communication processor 230 is capable of selecting the controller 400 to which an I/O request is issued, in accordance with a situation of the plurality of controllers 400 and it is possible to improve a performance of the computer system. As in the device modes #2, #4, when the interface device 200 presents a plurality of functions of the same protocol respectively corresponding to a plurality of paths, the server apparatus 100 is capable of selecting a path to issue an I/O command.

A case where the interface device 200 is configured to the device mode #3 will be described, below. In this case, the OS 112 includes a driver #0 using the FCP and a driver #2 using the NVMe.

The following is a description of an operation of the computer system.

Figure 4:
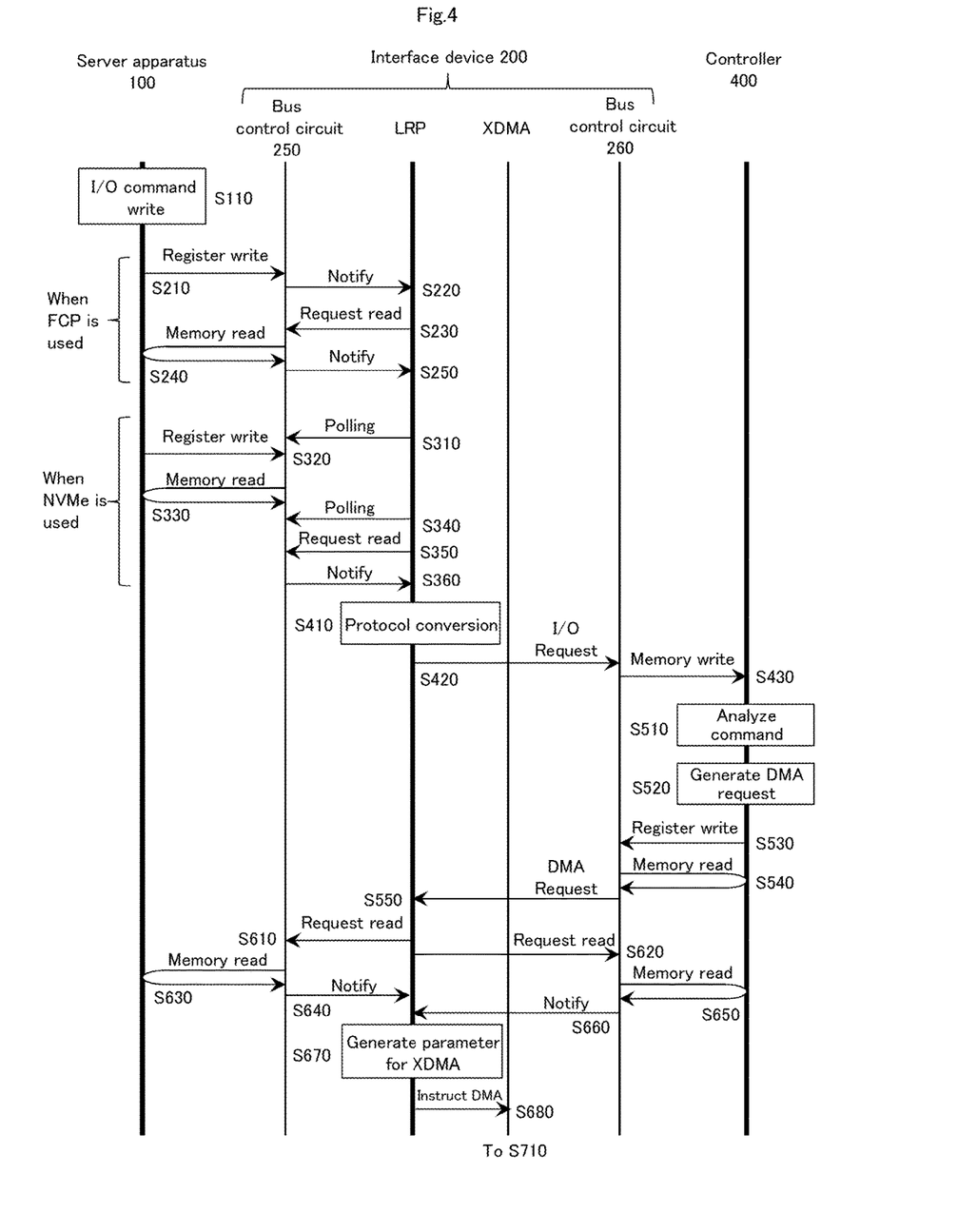
FIG. 4 shows a first process of an I/O process.
Figure 5:
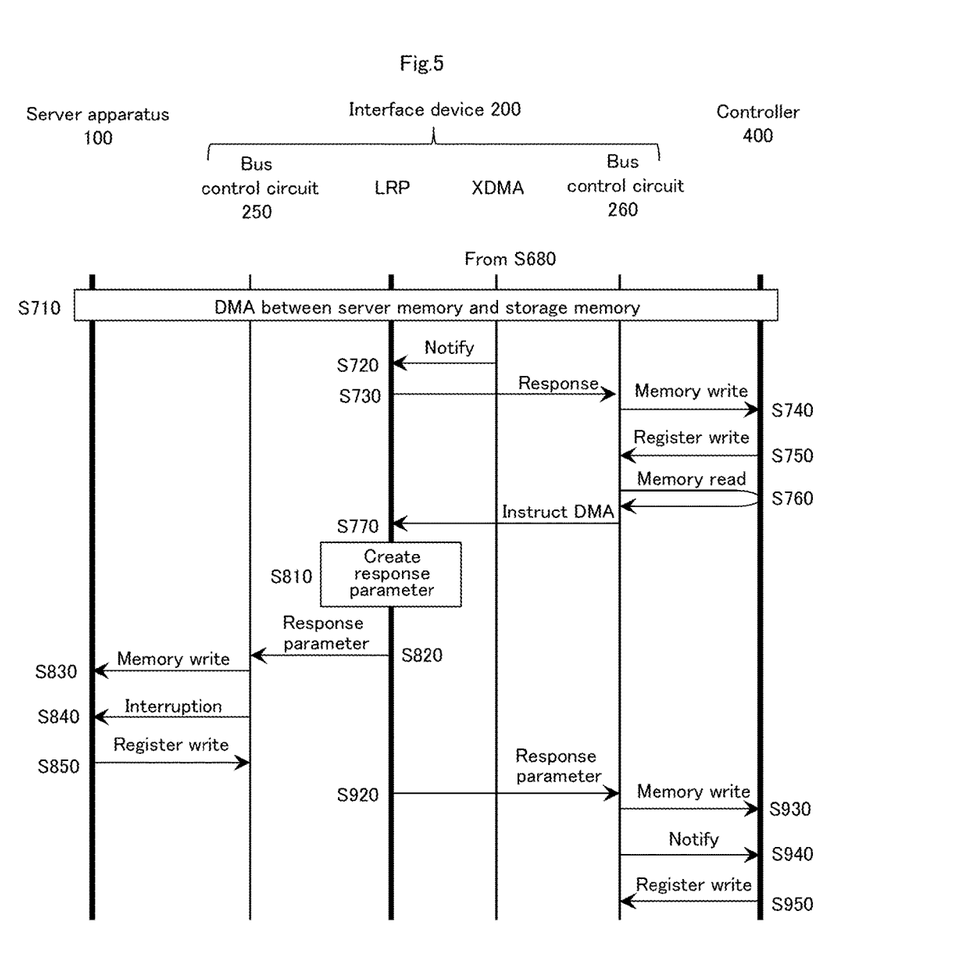
FIG. 5 shows a second process following the first process of the I/O process.

FIG. 4 shows a first process of an I/O process and FIG. 5 shows a second process subsequent to the first process of the I/O process.

The sequence shows an operation of: the server apparatus 100, the bus control circuit 250 in the interface device 200, the communication processor (LRP) 230 in the interface device 200, the DMA controller (XDMA) 240 in the interface device 200, the bus control circuit 260 in the interface device 200, and the controller (CTL) 400 in the storage apparatus 300.

In S110, when the driver 144 writes an I/O command on the memory 110 in response to a request from the application 113 of the server apparatus 100, an I/O process is started. Here, the driver 144 secures, as a server-side storage area, a storage area in the memory 110 necessary for transferring data, creates a Scatter/Gather List (SGL) indicating an address of the server-side storage area, and writes the SGL into the memory 110. When the I/O command requests write, the driver 144 writes write data into the server-side storage area.

When the application 113 writes an I/O command (FCP command, specific command) for the driver #0, the driver #0 executes processes of S210 to S250.

In S210, the driver #0 writes identification information of the I/O command into the I/O command start register 211a, and the bus control circuit 250 enters the identification information into the I/O command start queue 220a corresponding to the I/O command start register 211a. In S220, the bus control circuit 250 notifies the processor core corresponding to the I/O command start queue 220a of the identification information. In S230, the processor core issues, to the bus control circuit 250, a command read request, on the basis of the identification information. In S240, the bus control circuit 250 reads the I/O command stored in the memory 110 in the server apparatus 100, on the basis of the read request, and writes the I/O command into the memory 270. In S250, the bus control circuit 250 notifies the processor core of the I/O command being read.

When the application 113 writes an I/O command (NVMe command) for the driver #2, the driver #2 executes processes of S310 to S360.

In S310, the processor core to which the NVMe function is allocated refers, by polling, to the I/O command start queue 220b to determine whether the identification information of the I/O command is written. When it is determined that the identification information of the I/O command is not written, the processor core is in a stand-by state.

In S320, the driver #2 writes a write notification of the I/O command, into the I/O command start register 211b, and the bus control circuit 250 enters the identification information into the I/O command start queue 220b. In S330, the bus control circuit 250 reads the I/O command stored in the memory 110 in the server apparatus 100, and writes the I/O command into the memory 270.

In S340, the processor core refers, by polling, to the I/O command start queue 220 again to determine whether the identification information of the I/O command is written. When it is determined that the identification information of the I/O command is written, in S350, the processor core issues a command read request to the bus control circuit 250. When the plurality of processor cores are allocated to the NVMe function, the processor core that detects, by polling, the identification information of the I/O command executes the subsequent processes. In S360, the bus control circuit 250 notifies the processor core of the I/O command being read. It is noted that instead of the polling in S340, a notification as in S220 may be executed and the both may be executed.

After S250 or S360, in S410, the processor core converts the read I/O command into an I/O request using the protocol of the storage apparatus 300, and writes the I/O request into the memory 270. The protocol of the storage apparatus 300 may be a standardized predetermined protocol or a protocol of a vendor proprietary. In S420, the bus control circuit 260 writes the I/O request into the memory 410 in the controller 400.

In S510, the controller 400 reads and analyzes the I/O request in the memory 410, and secures, as a storage-side storage area, a storage area in the memory 410 necessary to transfer data. Here, the controller 400 creates an SGL indicating an address of the storage-side storage area, and writes the SGL into the memory 410. When the I/O request requests read, the controller 400 reads read data from the storage device 320, and writes the read data into the storage-side storage area.

In S520, the controller 400 generates a DMA request requesting a transfer of data between the memory 110 in the server apparatus 100 and the memory 410 in the controller 400, and writes the DMA request into the memory 410. In S530, the controller 400 writes the identification information of the DMA request, into the storage register in the bus control circuit 260 in the interface device 200. In S540, on the basis of the identification information, the bus control circuit 260 reads the DMA request stored in the memory 410 in the controller 400, and writes the DMA request into the memory 270. In S550, the bus control circuit 260 notifies the processor core of the DMA request.

In S610, the processor core writes an SGL read request requesting to read the SGL in the memory 110 of the server apparatus 100, into the memory 270. In S620, the processor core writes an SGL read request requesting to read the SGL in the memory 410 of the controller 400, into the memory 270.

In S630, the bus control circuit 250 reads the SGL stored in the memory 110 in the server apparatus 100, and writes the read SGL into the memory 270. In S640, the bus control circuit 250 notifies the processor core of the SGL being read from the server apparatus 100. In S650, the bus control circuit 260 reads the SGL stored in the memory 410 of the controller 400, and writes the read SGL into the memory 270. In S660, the bus control circuit 260 notifies the processor core of the SGL being read from the controller 400.

In S670, the processor core generates a request parameter requesting a DMA between the server-side storage area and the storage-side storage area, on the basis of the SGL read from the server apparatus 100 and the SGL read from the controller 400. In S680, the processor core instructs the DMA to the DMA controller 240 by using the generated request parameter.

In S710, the DMA controller 240 executes the DMA on the basis of the request parameter. When the I/O command requests write, the DMA controller 240 transfers the write data stored in the server-side storage area, to the storage-side storage area. When the I/O command requests read, the DMA controller 240 transfers the read data stored in the storage-side storage area, to the server-side storage area.

In S720, the DMA controller 240 notifies the processor core of completion of the DMA when the DMA is completed. In S730, as a response to the DMA request, the processor core writes the notification of the completion of the DMA, into the memory 270. In S740, the bus control circuit 260 writes the notification into the memory 410 in the controller 400. In S750, the controller 400 reads the notification stored in the memory 410, writes, as a response to the I/O request, information indicating the completion, into the memory 410, and writes the identification information of the response, into the storage register in the interface device 200. In S760, the bus control circuit 260 reads the response stored in the memory 410 in the controller 400, on the basis of the identification information, and writes the response into the memory 270. In S770, the bus control circuit 260 notifies the processor core of the response.

In S810, the processor core creates a response parameter to the server apparatus 100 and the storage apparatus 300, and writes the response parameter into the memory 270.

In S820, the processor core requests the bus control circuit 250 to notify the completion of creation of the response parameter. In S830, the bus control circuit 250 writes the response parameter stored in the memory 270, into the memory 110 in the server apparatus 100. In S840, the bus control circuit 250 issues an interruption of PCIe to the server apparatus 100. In S850, in response to the interruption, the driver 114 in the server apparatus 100 reads the response parameter stored in the memory 110, and writes a notification of reception of the response parameter into the I/O command start register 211.

In S920, the processor core requests the bus control circuit 260 to notify the completion of creation of the response parameter. In S930, the bus control circuit 260 writes the response parameter stored in the memory 270, into the memory 410 in the controller 400. In S940, the bus control circuit 260 writes the notification of the response parameter into the memory 410 in the controller 400. In S950, in response to the notification, the controller 400 reads the response parameter stored in the memory 410, writes a reception of the response parameter into the storage register, and ends the sequence.

According to the above I/O process, when the interface device 200 converts the I/O command from the server apparatus 100 into the I/O request of the protocol of the storage apparatus 300 and issues the I/O request to the storage apparatus 300, it is possible to eliminate a need of complying with the protocol of the server apparatus 100 and changing the protocol of the storage apparatus 300. Further, when the server apparatus 100 and the storage apparatus 300 create the SGL indicating the storage area which is a transfer source and transfer destination of a DMA is transferred, the interface device 200 is capable of executing the DMA between the memory 110 in the server apparatus 100 and the memory 410 in the storage apparatus 300. When the interface device 200 executes the DMA, it is possible to transfer data when the server apparatus 100 does not use the protocol of the storage apparatus 300 and the storage apparatus 300 does not use the protocol of the server apparatus 100. When it is less likely that the FCP function and the NVMe function are simultaneously busy, if the FCP function and the NVMe function share the storage-side bus, then it is possible to effectively use the band of the storage-side bus.

Second Embodiment

In the present embodiment, description will proceed with a focus on a difference from the first embodiment.

A configuration of a computer system of the present embodiment will be described, below.

Figure 6:
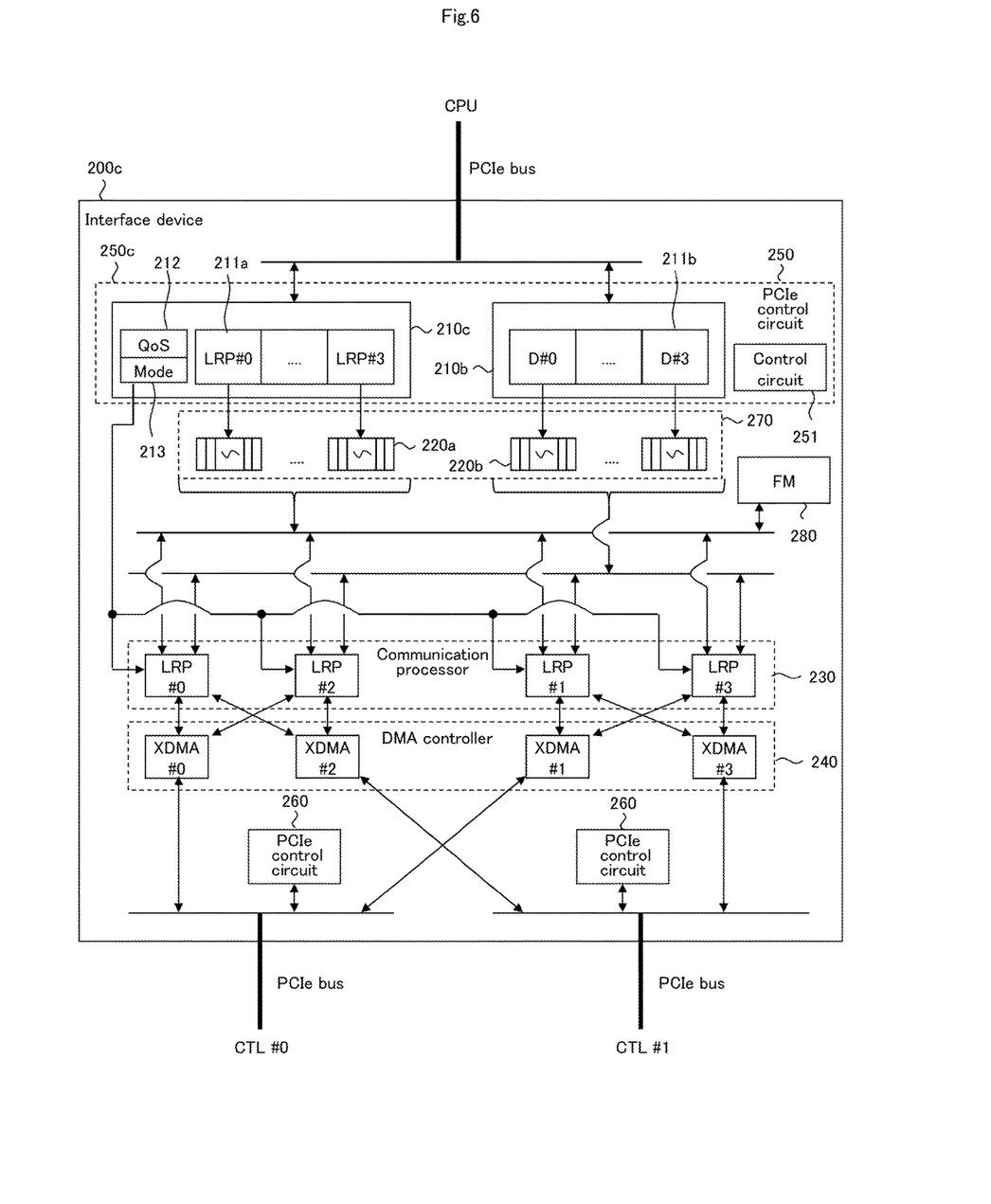
FIG. 6 shows a configuration of an interface device 200c according to a second embodiment.

FIG. 6 shows a configuration of an interface device 200c according to a second embodiment.

When compared with the first embodiment, in the present embodiment, the interface device 200c is used instead of the interface device 200, a bus control circuit 250c is used instead of the bus control circuit 250, and a server register 210c is used instead of the server register 210a. The server register 210c includes, in addition to the configuration of the server register 210a, a QoS counter register 212 and a Mode register 213. Similarly to the first embodiment, the server register 210c is allocated to an MMIO space used by the CPU 120 and written by the driver 114a using the FCP function.

As in the above-described device modes #3, #4, when the plurality of protocols share the processor core, the interface device 200c of the present embodiment increases and decreases, in accordance with the band needed by each function, the number of processor cores used by each function, and the band of the interface device 200c is effectively used.

The Mode register 213 shows either one of an FCP mode or an NVMe mode for each processor core in order to switch the functions allocated to the processor core. As a result, the driver 114a is capable of controlling the band of the NVMe function. The driver 114a issues write to the Mode register 213 to thereby dynamically switch the processor mode showing the operation of processor cores #0 to #3 to either one of the FCP mode or the NVMe mode.

The processor core measures, in response to an instruction from the driver 114a, statistical information instructing QoS (Quality of Service) such as the number of I/O commands to be issued (Input/Output Per Second: TOPS) and a data transfer amount (throughput) for each processor core, and writes the same into the QoS counter register 212. The driver 114a includes a QoS function. The QoS function acquires the statistical information from the QoS counter register 212. The driver 114 determines the switching of the processor modes, on the basis of the statistical information.

Figure 7:
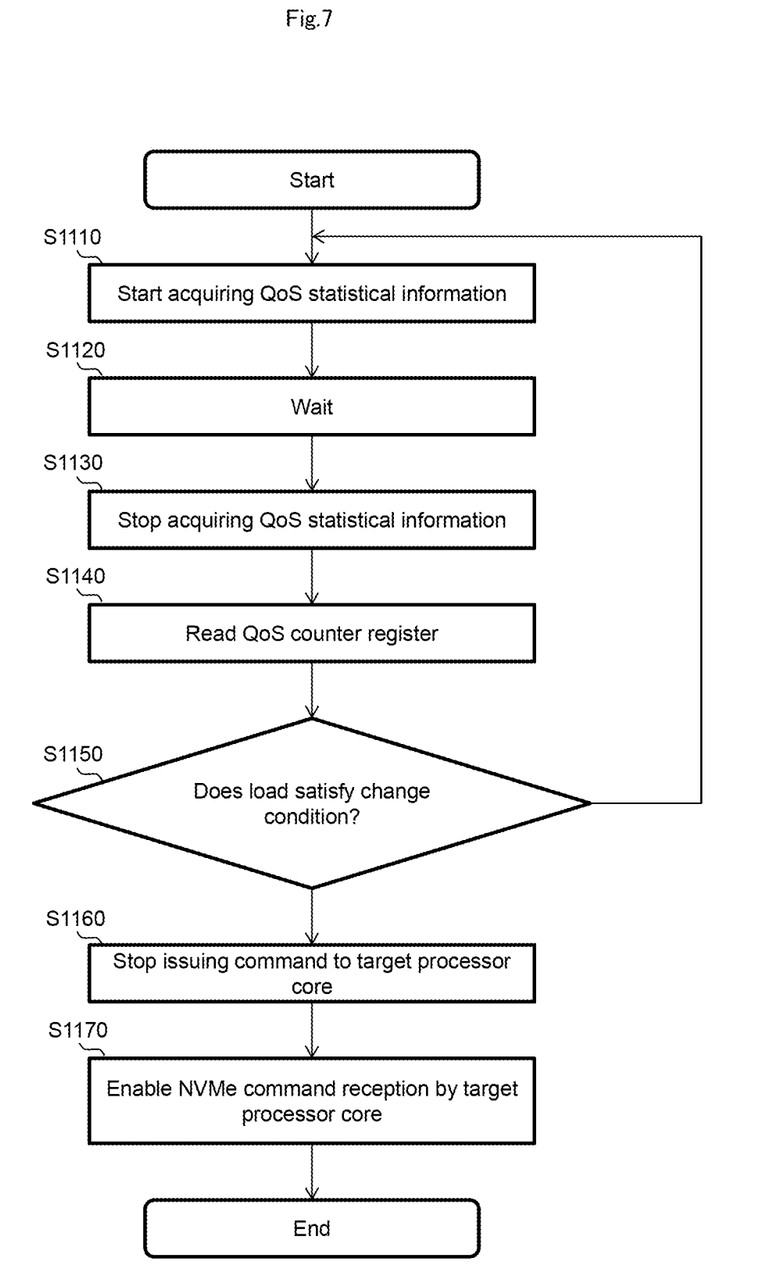
FIG. 7 shows a processor core allocation change process.

FIG. 7 shows a processor core allocation change process.

In S1110, the driver 114a enables the QoS function and starts measuring the statistical information. In S1120, the driver 114a is in a stand-by state until a predetermined measurement time elapses. In S1130, the driver 114a stops measuring the statistical information. In S1140, the driver 114a reads the statistical information from the QoS counter register 212. In S1150, the driver 114a determines whether or not a load of a plurality of processor cores satisfies a change condition, on the basis of the statistical information. Examples of the change condition include a load of a processor core in the FCP mode being less than a previously configured load threshold value and a load of a processor core in the NVMe mode being equal to or more than the previously configured load threshold value. The load may be an IOPS, may be a throughput, and may be a value based on a combination of these. The load threshold value is 80% the maximum value of the load of the processor core, for example. It is noted that the driver 114a is capable of configuring a change condition on the basis of an instruction from a user or an instruction from a management subsystem. Respectively different load threshold values may be configured to the processor core of the FCP and the processor core of the NVMe.

When it is determined that the load of the plurality of processor cores does not satisfy the change condition (S1150: No), the driver 114a shifts the process to S1110. When it is determined that the load of the plurality of processor cores satisfies the change condition (S1150: Yes), in S1160, the driver 114a selects one processor core in the FCP mode as a target processor core and stops issuing the I/O command to the target processor core. In S1170, the driver 114a changes the processor mode of the target processor core to the NVMe mode and writes the changed processor mode into a Mode register 123, enables the target processor core to receive the I/O command of the NVMe, and ends the flow.

It is noted that the driver 114a may execute, similarly to the flow, a process of changing the processor core of the NVMe mode to the FCP mode. An administrator may configured, as a parameter of the driver 114a, the change condition and the load threshold value, by the server apparatus 100 or the management subsystem.

It is assumed that for example, from among four processor cores, two processor cores are allocated to the FCP function, the other two processor cores are allocated to the NVMe function, and the load threshold value is 40%. When the load of the processor core of the FCP function is 10% and the load of the processor core of the NVMe function is 50%, the driver 114a allocates one processor core of the FCP function, to the NVMe function.

According to the processor core allocation change process described above, when the processor core allocated to a certain protocol is allocated to another protocol, it is possible to effectively use the performance of the interface device 200c. When the interface device 200c measures the load information for each processor core and stores the same into a register, the server apparatus 100 is capable of acquiring the load information and recognizing a processor core having a high load. As a result, the driver 114a is capable of changing the allocation of the processor core, in accordance with the load.

When the server apparatus 100 executes the driver of the FCP function and the driver of the NVMe function, as in the processor core allocation change process, it is possible to include a function not provided in a normal driver of the NVMe, into the driver of the FCP function. When such a driver of the FCP function is used, software of the server apparatus 100 is capable of changing the allocation of the processor core and controlling the band for each protocol. Further, when the driver 11a allocates a large number of processor cores to a function having a high load, it is possible to effectively use the performance of the interface device 200c.

Further, from among the storage devices 320, the driver 114a maps the boot device to the FCP function, maps the data device to the NVMe function, executes an OS boot by the FCP function, and thereafter, allocates all the processor cores in the communication processor 230, to the NVMe function, whereby the NVMe function is allowed to use all the bands that are physically securable in the I/O process.

As a storage apparatus, the interface devices 200, 200c, the storage apparatus 300, etc., may be used. As an interface apparatus, the interface devices 200, 200c, etc., may be used. As a host computer, the server apparatus 100, etc., may be used. As a processor, the communication processor 230, etc., may be used. As a memory, the memory 270, etc., may be used. As a DMA controller, the DMA controller 240, etc., may be used. As a host-side bus, the server-side bus, etc., may be used. As a non-volatile memory, the flash memory 280, etc., may be used. As an OS, the OS 112 may be used. As a start program, the boot driver 111, etc., may be used. As a host memory, the memory 110, etc., may be used. As a storage memory, the memory 410, etc., may be used.

The present invention is limited to the aforementioned embodiments, and may be changed into various other formats providing it does not deviate from scope of its original intent. For example, the interface device 200 may not be included in the server apparatus 100, as described above; however, the interface device 200 may be included in the storage apparatus 300 and may not be included in the server apparatus 100 nor the storage apparatus 300.

REFERENCE SIGNS LIST

100 . . . Server apparatus, 110 . . . Memory, 120 . . . CPU, 200, 200c . . . Interface device, 230 . . . Communication processor, 240 . . . DMA controller, 250, 250c . . . Bus control circuit, 260 . . . Bus control circuit, 270 . . . Memory, 280 . . . Flash memory, 300 . . . Storage apparatus, 320 . . . Storage device, 400 . . . Controller, 410 . . . Memory, 430 . . . Drive interface

The invention claimed is:

1. A storage apparatus, comprising:
a storage device;
a controller coupled to the storage device; and
an interface device coupled to the controller via a storage-side bus and coupled to a host computer via a host-side bus based on a PCI Express specification, the interface device includes a plurality of processor cores, and each of the plurality of processor cores is allocated to any one of the plurality of functions and is configured to execute the allocated function, wherein
the interface device is configured to provide to the host computer a plurality of functions based on a PCI Express specification,
the interface device is configured to, when the host computer is started and a command for instructing to read an OS stored in the storage device in accordance with a specific protocol is issued from the host computer to a specific function from among the plurality of functions, issue to the controller a request for instructing to read the OS and transfer the OS read by the controller to the host computer,
the interface device is configured to, when an NVMe command for instructing an I/O with respect to the controller in accordance with an NVMe protocol is issued from the host computer to an NVMe function from among the plurality of functions after the host computer is started, issue to the controller an I/O request based on the NVMe command, and
a specific driver stored in the host computer is configured to allow the host computer to issue the specific command to a specific function and allow the host computer to change the number of processor cores allocated to each of the plurality of functions.

2. A storage apparatus according to claim 1, wherein
the interface device is configured to, when the NVMe command is issued from the host computer via the host-side bus, issue the I/O request to the controller and transfer data based on the NVMe command via the host-side bus, and
the interface device is configured to, when a specific command for instructing an I/O with respect to the controller in accordance with the specific protocol is issued from the host computer via the host-side bus to the specific function, issue a specific request based on the specific command to the controller and transfer data based on the specific command via the host-side bus.

3. A storage apparatus according to claim 2, wherein
the interface device is configured to acquire host memory information that is generated by the host computer and that indicates a storage area of a host memory in the host computer, acquire storage memory information that is generated by the controller in response to either one of the I/O request or the specific request and that indicates a storage area of a storage memory in the controller, and execute a DMA between the host memory and the storage memory on the basis of the host memory information and the storage memory information.

4. A storage apparatus according to claim 3, wherein
the interface device is configured to execute a DMA that passes through the storage-side bus on the basis of the specific command and execute a DMA that passes through the storage-side bus on the basis of the NVMe command.

5. A storage apparatus according to claim 4, comprising: a plurality of controllers including the controller, wherein
the interface device is coupled to each of the plurality of controllers via a plurality of storage-side buses including the storage-side bus.

6. A storage apparatus according to claim 5, wherein
the interface device includes a non-volatile memory which stores a start program for starting the host computer in an extended ROM space provided to the host computer and based on a PCI Express specification,
when the host computer is started, the start program is read by the host computer, and
the start program is configured to allow the host computer to issue the command.

7. A storage apparatus according to claim 1, wherein
the interface device is configured to measure a load of each of the plurality of processor cores and store load information indicating the load, and
the specific driver is configured to allow the host computer to read the load information to execute the change on the basis of the load information.

8. A storage apparatus according to claim 7, wherein the plurality of functions include any one of a plurality of specific functions and a plurality of NVMe functions.

9. A storage apparatus according to claim 2, wherein
the interface device is configured to convert the NVMe command into the I/O request that complies with a protocol of the controller, and
the interface device is configured to convert the specific command into the specific request that complies with a protocol of the controller.

10. An interface apparatus, comprising:
a memory; and
a plurality of processor cores, and each of the plurality of processor cores is allocated to any one of a plurality of functions and is configured to execute the allocated function, the plurality of processor cores coupled to a host computer via a host-side bus based on a PCI Express specification, coupled to a storage apparatus via a storage-side bus, and coupled to the memory, wherein
each of the processor cores is configured to provide to the host computer a plurality of functions based on a PCI Express specification,
each of the processor cores is configured to, when the host computer is started and a command for instructing to read an OS stored in the storage apparatus in accordance with a specific protocol is issued from the host computer to a specific function from among the plurality of functions, issue to the storage apparatus a request for instructing to read the OS and transfer the OS read by the storage apparatus to the host computer, and
each of the processor cores is configured to, when an NVMe command for instructing an I/O with respect to the storage apparatus in accordance with an NVMe protocol is issued from the host computer to an NVMe function from among the plurality of functions after the host computer is started, issue an I/O request based on the NVMe command to the storage apparatus, and
wherein a specific driver stored in the host computer is configured to allow the host computer to issue the specific command to a specific function and allow the host computer to change the number of processor cores allocated to each of the plurality of functions.

* * * * *